United States Patent [19]

Liu et al.

[11] Patent Number: 4,599,666
[45] Date of Patent: Jul. 8, 1986

[54] DISK DRIVE SYSTEM APPARATUS BAND ACTUATOR

[76] Inventors: Jeffrey Liu, 575 E. Middlefield Rd., Mountain View, Calif. 94043; Chun H. Tong, 1611 Garvey Pl., San Jose, Calif. 95132

[21] Appl. No.: 472,542
[22] Filed: Mar. 7, 1983
[51] Int. Cl.$^4$ .............................. G11B 21/08
[52] U.S. Cl. ................... 360/106; 360/97
[58] Field of Search .................. 360/97–99, 360/105–106

[56] References Cited

U.S. PATENT DOCUMENTS 4,161,004 7/1979 Dalziel ..................... 360/106
4,418,370 11/1983 Harrison .................. 360/106
4,471,396 9/1984 Iftikar ..................... 360/106

Primary Examiner—A. J. Heinz
Attorney, Agent, or Firm—Harris Zimmerman; Howard Cohen

[57] ABSTRACT

In a magnetic disk drive system, an apparatus for facilitating movement of a transducer head carriage relative to a rotating magnetic disk and stationary chassis, including a three-arm band actuator for coupling a stepper motor to the carriage, and an extruded metal carriage base for retaining linear bearings which ride along a track as the carriage is advanced by the stepper motor. An "S" shaped ribbon cable connects the transducer head to the chassis, and expands and contracts as the carriage moves.

1 Claim, 14 Drawing Figures

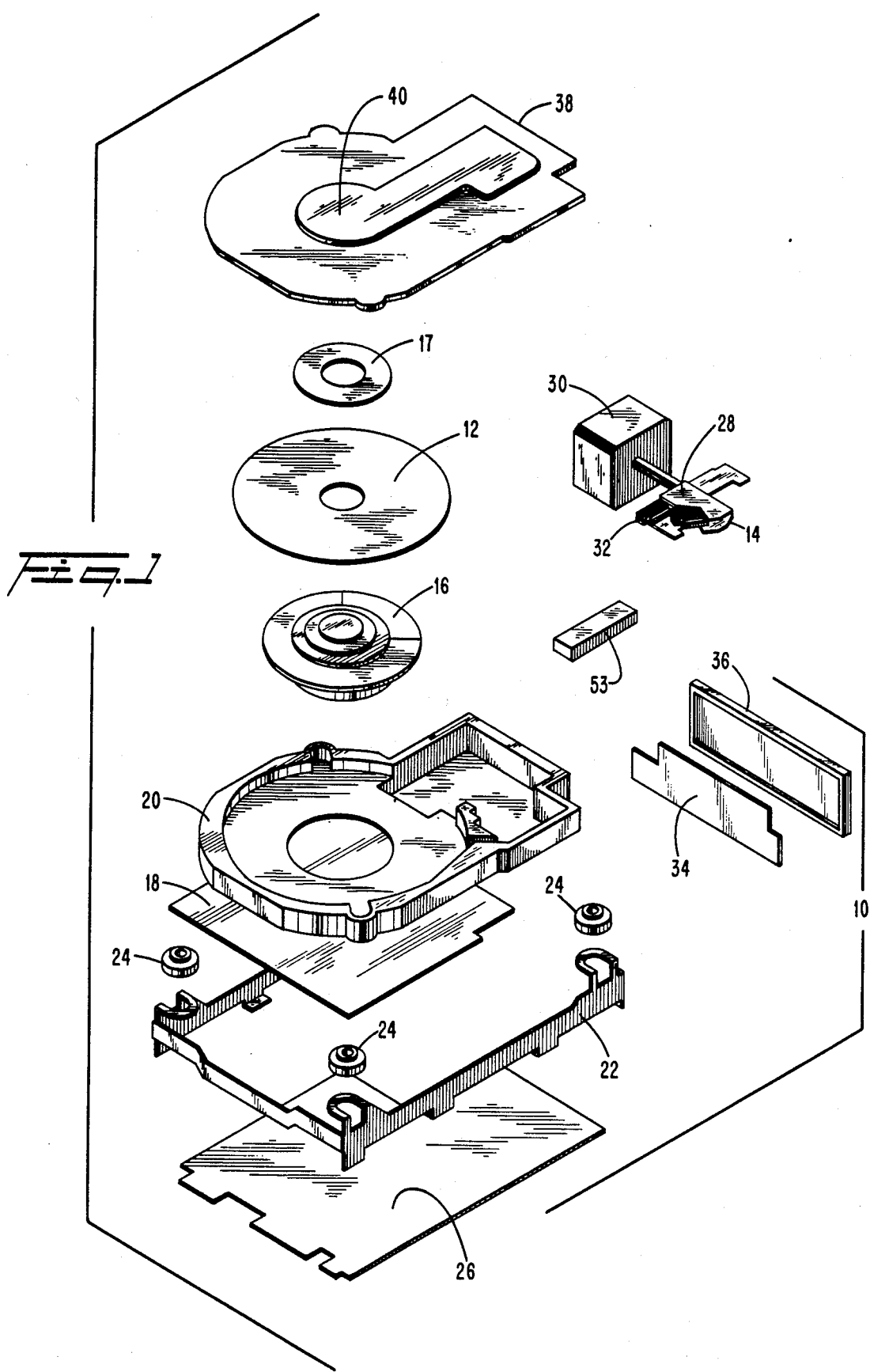

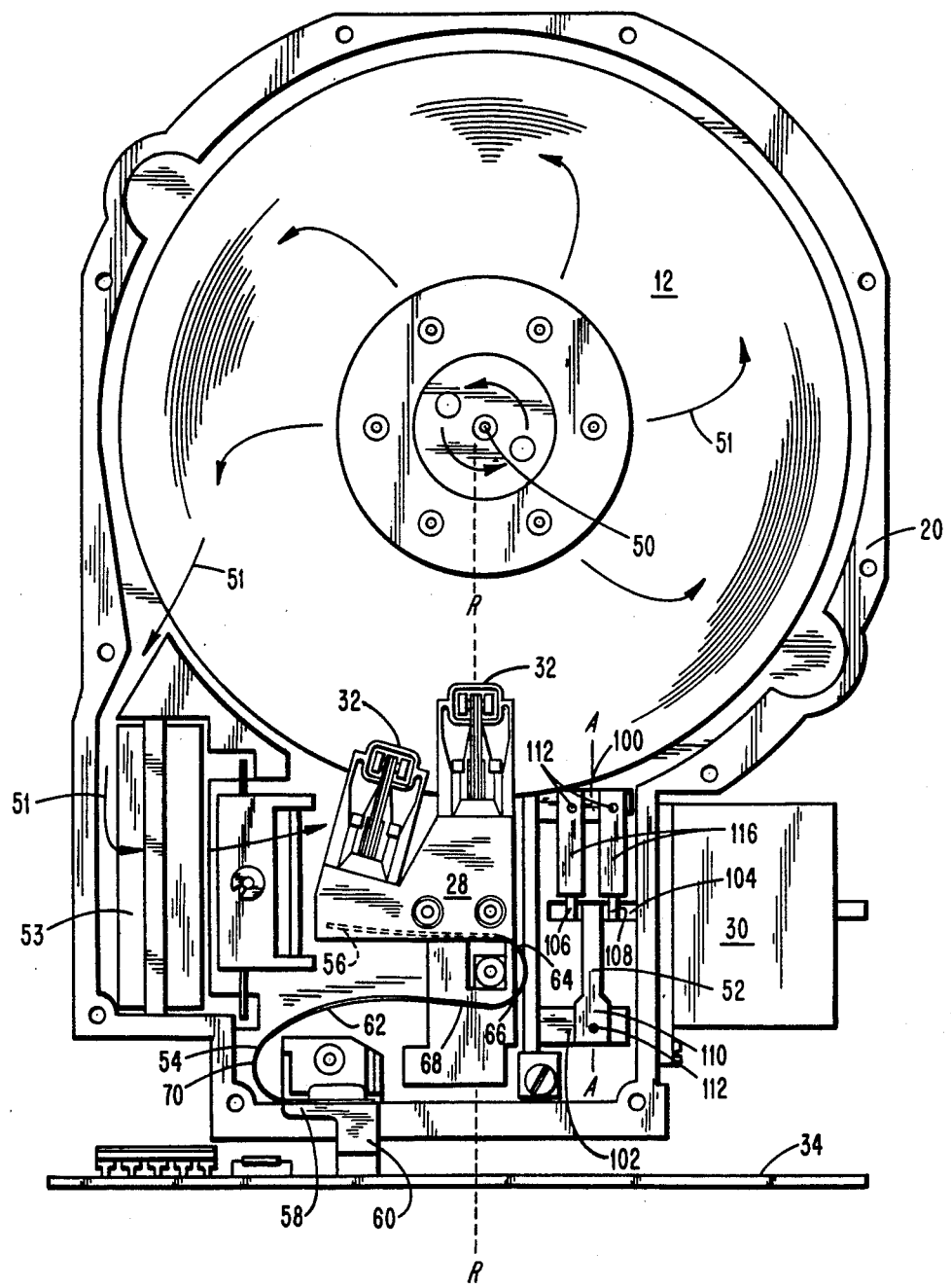

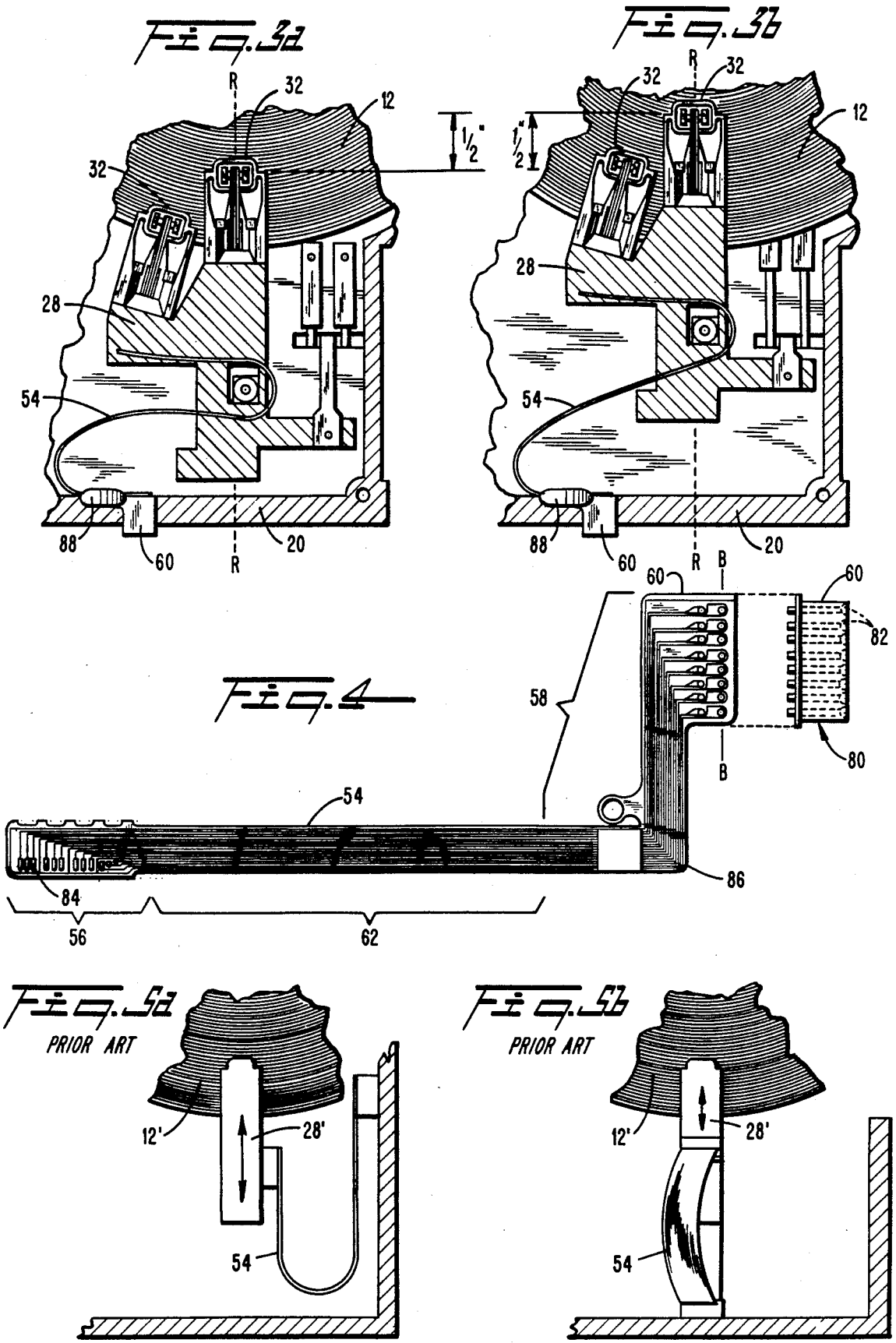

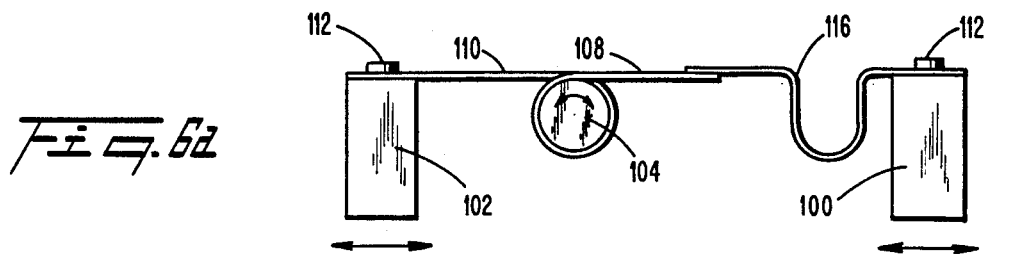
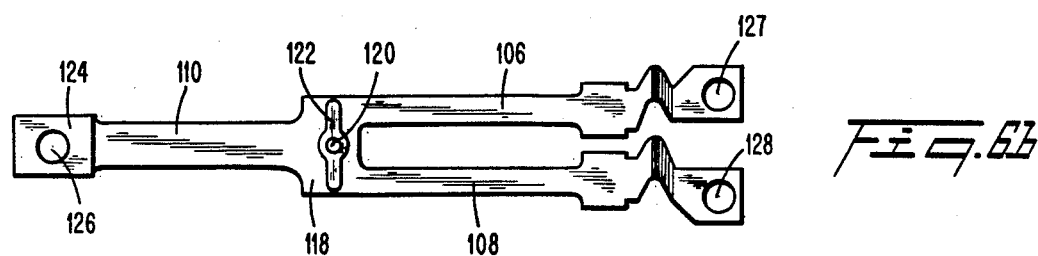
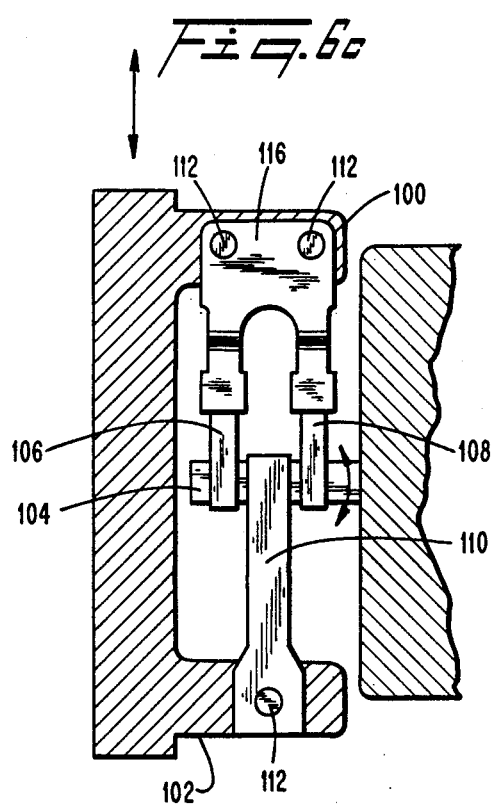
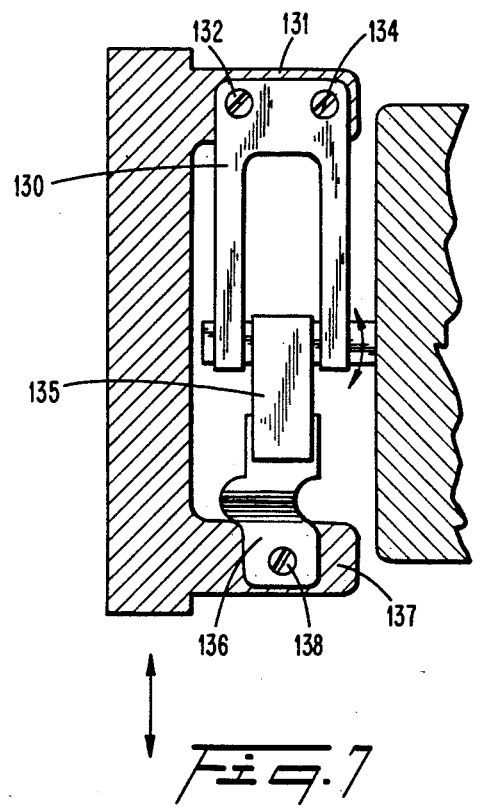

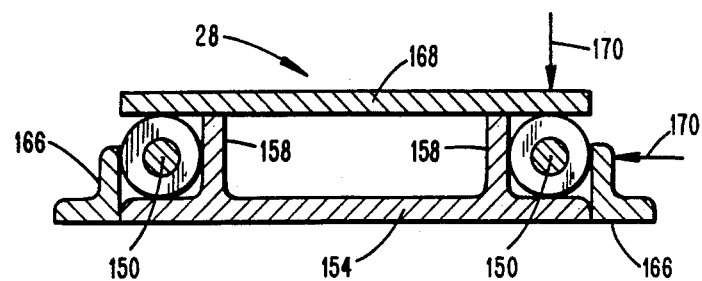
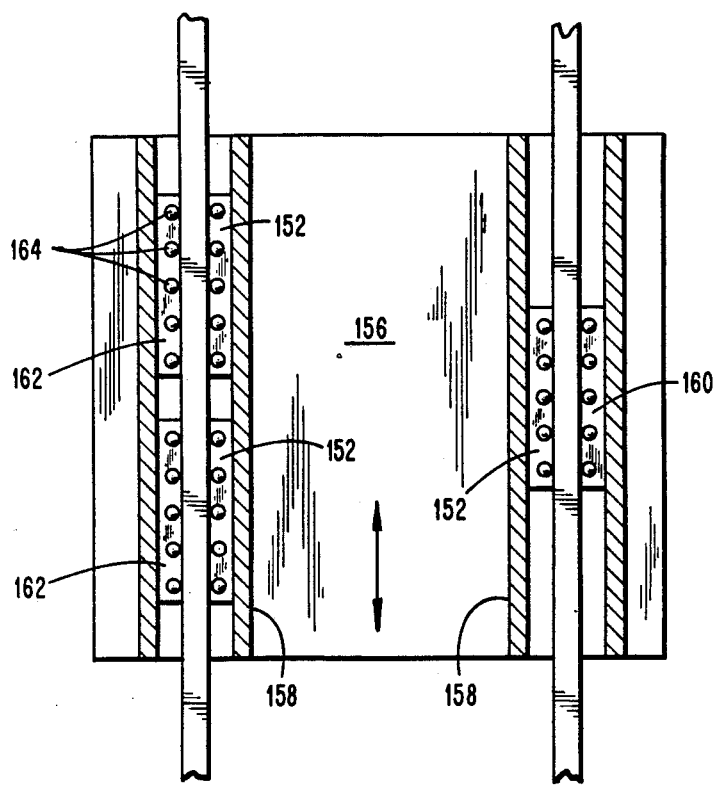
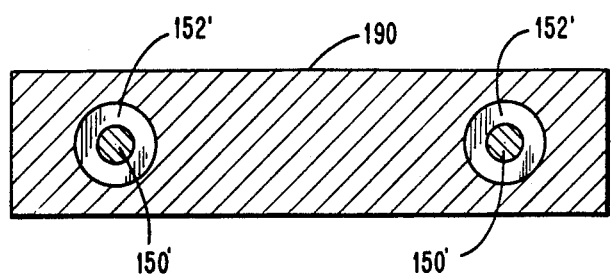
PRIOR ART

DISK DRIVE SYSTEM APPARATUS BAND ACTUATOR

BACKGROUND OF THE INVENTION

The present invention is directed to magnetic disk information storage systems, and more specifically to structures associated with a movable carriage for one or more read-write heads.

In magnetic disk systems, bits of information are typically stored in concentric circular tracks on one or both surfaces of the disk. An electromagnetic transducer, or "head", located in close proximity to the recording surface is used to write the information on the disk, and subsequently read it, while the disk is continuously rotating. Data recovery involves detecting the presence of flux transitions beneath a selected head. Magnetized particles that pass beneath the head gap generate a current flow in the head circuit. The direction of current is determined by polarity of this magnetic field.

To enable the head to access the various tracks on the disk, it may be mounted on a movable carriage so as to be translatable in a generally radial direction. The carriage may take the form of a pivotable tone arm type of arrangement, similar to that seen on many phonographic turn-tables, in which the head moves along a generally radial path across the surface of the disk. Alternatively, the carriage can be arranged to linearly translate along a track defining a path radial with respect to the axis of rotation of the disk.

Initially such magnetic disks were relatively large and employed relatively large storage disks or drums, e.g. 14 inches or greater in diameter. Because of trends toward the reduction in size of computer systems in general, a demand has resulted for smaller disk storage systems, such as a Winchester disk drive system with a 5¼ inch hard disk.

It is a general object of the present invention to provide techniques for producing small, economical disk drive systems.

In the moving carriage systems, electrical connections must be made between each transducer head and stationary amplifier circuitry attached to the system chassis. In the past, single "U" shaped cable loops have been employed to provide the necessary "play" between the carriage and chassis. Two such prior art cables are illustrated in FIGS. 5a and 5b, discussed below. U.S. Pat. No. 4,285,018 to Mulvany et al discloses a disk drive system employing a "U" shaped cable 42 which connects radially driven heads to a stationary panel connector 76. U.S. Pat. No. 4,331,991 to Morehouse et al and U.S. Pat. No. 4,346,416 to Riggle et al show "U" shaped ribbon cables connecting moving "tone arm" mounted heads to stationary portions of the respective systems.

Reduction in size of the disk drive system severely limits the space available for a free-flexing cable. Cable fatigue, excessive cable length and excessive or uncontrolled cable excursion also present design problems.

It is an object of the present invention to provide a flexing connector cable assembly which has a compact configuration.

It is another object of the present invention to provide a flexing connector cable assembly and associated system layout which has a compact configuration.

It is another object of the present invention to provide a flexing connector cable assembly and associated systems layout which reduces overall cable length between the heads and a system pre-amplifier.

It is another object of the present invention to provide a flexing connector cable assembly which has a compact arrangement configured to reduce fatigue on the cable caused by the flexing.

It is another object of the present invention to provide a flexing connector cable assembly which has a compact configuration which inhibits unwanted cable excursion from a defined volume within the system.

Reduction in size of disk drive systems and the requirements from higher density information storage has created difficulties in the provision of components with acceptable dimensional and alignment tolerances. This is particularly true with carriage and carriage drive mechanisms. Distances on the order of 0.0004 inches can determine whether the transducer heads are positioned on the correct information streams.

In the past, carriages have been driven along a track by a stepper motor coupled to the carriage by a band actuator. A prior art band actuator is shown in FIG. 7 and discussed below. Problems are encountered in the prior art system if the stepper motor, bands and carriage arms, to which the bands are attached, are improperly dimensioned or aligned. Excessive band wear and mis-positioning of the heads may result.

Accordingly, it is an object of the present invention to provide a band actuator system which allows for slight deviations in the size and alignment of the associated system components.

It is another object of the present invention to provide a band actuator system which inhibits band wear and mis-positioning.

A related problem in carriage systems involves the tracks and bearings which constrain the carriage to move along a radial path in response to the band actuator.

It is another object of the present invention to provide a small, inexpensively fabricated, high tolerance carriage and track system for a magnetic disk system.

These and other object and features will be apparent from the description of the invention contained herein including the claims.

SUMMARY OF THE INVENTION

The present invention relates to a magnetic disk drive system and more particularly to structures associated with a movable carriage for magnetic transducer heads employed in the system.

A magnetic disk drive system includes a disk drive chassis having a mechanism for rotating a magnetic storage disk about an axis of rotation. An amplifier circuit, such as a preamplifier for signals from the system transducer heads, may be fixed in a stationary position on the disk drive chassis. A movable carriage for one or more of the magnetic transducer heads is movably mounted on the disk drive chassis. A stepper motor may be provided to move the carriage along a track defining a radial path of motion.

Electrical connection between the moving heads and the stationary circuits may be provided by a flexible multi-conductor ribbon cable. The ribbon cable may include a first portion fixed to the carriage and electrically connected to the transducer heads, a second portion fixed to the disk drive chassis, and a third portion located between the first and second portions and configured in an "S" figure.

In a preferred embodiment of the present invention, the "S" figure lies in a plane generally perpendicular to the axis of rotation of the magnetic storage disk. An input section of the amplifier circuit is located on a circuit board whose principal plane is parallel to the axis of rotation of the disk. The "S" shaped figure may expand and contract along a radial line of movement of the carriage. The "S" shaped third portion may be constrained to lie between the location of the magnetic disk, the circuit board and the stepper motor.

The "S" shaped portion of the cable may be configured so that it extends away from the carriage and away from the axis of movement of the carriage, then curves back inwardly toward the axis of movement, then passes the axis of movement and extends away from the axis of movement, then curves back toward the axis of movement until it reaches a point of attachment with the disk drive chassis.

In a preferred embodiment of the present invention, the movable carriage may ride on a carriage track. The carriage may be formed with a first arm and a second arm, parallel to the first arm, both arms being perpendicular to the path of radial motion of the carriage along the track. A drive mechanism may be provided for moving the carriage along the track including a stepper motor stationary with respect to the track and having a rotating shaft parallel to the first and second arms. A first flexible band may be attached to the first arm and to the shaft so that the band is wound and unwound about the shaft as the shaft is rotated. A second flexible band is attached to the first arm, at a point displaced from the first band, and attached to the shaft at a point displaced from the first band. The second band is wound and unwound about the shaft as the shaft rotates. Each of the first and second bands contain a spring for maintaining a tension on the band. Finally, a third flexible band may be attached to the second arm of the carriage and to the shaft at a point between the points of attachment of the first and second bands. In a like fashion, the third band is wound and unwound about the shaft as the shaft rotates. The third band does not contain a tensioning spring and thus precisely locates the shaft relative to the second arm. The three bands may be integrally formed in a "U" shape.

The bands may be connected to their respective arms with pins so that the bands are free to pivot slightly with respect to the arms, shaft and one another to compensate for small errors in the dimensions of a parts or the alignments of the parts.

In another preferred embodiment of the present invention, the carriage track comprises a pair of parallel rods and the carriage includes an extruded metal based member having a plate portion and two parallel rib portions on the principal surface thereof. Linear bearings are disposed against at least one of the parallel ribs. The linear bearings receive the parallel rods of the carriage track and the carriage is slidably movable along the track. In a preferred embodiment, the linear bearings are cylindrical and are each pressed against a rib and the plate portion so that the longitudinal axis of the bearings are adjusted to be parallel with the pair of rods of the carriage track.

BRIEF DESCRIPTION OF THE DRAWINGS

FIG. 1 is an exploded, pictorial diagram of a magnetic disk system employing structures of the present invention.

FIG. 2 is a plan view of the magnetic disk system of FIG. 1.

FIGS. 3a and 3b are details of the magnetic disk system of FIGS. 1 and 2 showing the flexing of the cable connector assembly embodiment of the present invention.

FIG. 4 is a plan view of a cable connector assembly of an embodiment of the present invention.

FIGS. 5a and 5b show prior art cable assemblies.

FIGS. 6a, 6b and 6c are a side elevation and two plan views of band actuator embodiments of the present invention.

FIG. 7 is a plan view of a prior art band actuator.

FIGS. 8a and 8b are a side elevation and a plan view in cross-section of a carriage and track assembly constructed according to the teachings of the present invention.

FIG. 9 is a side elevation of a prior art carriage and track assembly.

DETAILED DESCRIPTION OF THE DRAWINGS

FIG. 1 is a exploded, pictorial diagram of a magnetic disk system employing structures of the present invention.

The disk system consists of a stationary chassis 10, a magnetic storage disk 12 and a movable transducer carriage 14. The magnetic storage disk 12 may be rotated with respect to the stationary chassis 10 by a brushless DC motor 16. The motor 16 may be controlled by circuitry on a motor control circuit board 18 sandwiched between chassis frame elements 20 and 22. The disk may be connected to the motor by disk clamp 17. The chassis frame 20 may be mounted on the chassis frame element 22 by means of shock mountings 24. An interface circuit board 26 may be located underneath the chassis frame element 22.

The movable carriage assembly 14 may include a carriage 28 and a stationary stepper motor 30 coupled thereto. Transducer heads 32 on the carriage 28 may be electrically connected to a preamplifier circuit board 34 sandwiched between the chassis frame 20 and a front panel 36 of the system. The carriage assembly and disk may be covered by a cover assembly 38 including a breather filter 40.

Structures associated with the movable carriage assembly will now be described in greater detail with reference to FIG. 2, wherein structures similar to those shown in FIG. 1 are identified by like numerals. The drawing of FIG. 2 is a plan view of a magnetic disk system embodiment of the present invention and is drawn approximately to scale. The system employs a small rigid magnetic storage disk 12 which in a preferred embodiment is approximately 5 ¼ inches in diameter. The disk is rotated about an axis of rotation 50 which is perpendicular to the plane of the drawing. The carriage assembly 28 may carry transducer heads 32 and is movable along a radial path R—R which intersects the axis of rotation 50.

Air flow through the system is precisely controlled. The direction of air flow is indicated by arrows 51. An air filter 53 is provided to reduce suspended matter in the flow.

Two transducer heads 32 are shown in FIG. 2, it being understood that additional heads may be disposed adjacent the concealed underside of the disk in a like fashion. One of the electromagnetic transducer heads moves along a generally radial path parallel to the radial axis R—R. The other head is both radially and circumferentially offset from the first head and travels along a path that is parallel to that of the first one. Due to the radial offset, the two heads cover different, concentric sections of the disk. Each section might contain a number of tracks equal to the number of steps in the travel of the carriage, so that the packing density of the disk is in essence doubled. Furthermore, the circumferential offset provides added space that is necessary to accomodate the second head and that is not available if the heads were placed in a line. The aspect of the system is the subject of a copending patent application by applicant.

In order to write information onto the surface of the disk 12 and subsequently retrieve it, the magnetic transducer heads 32 are disposed in close proximity thereto. The magnetic disk 12 is rotated about the axis of rotation 50 at a constant angular velocity by the motor 16. During the recording of information, electrical impulses are applied to the heads, causing them to generate a magnetic field that orients the magnetic particles on the surface of the disk, to thereby store information. For subsequent reading of the stored information, the head is responsive to the magnetic orientation of the particles and generates electrical signals indicative of this orientation.

The reading and writing of information by the heads 32 is carried out while the disk 12 is rotating and the head is stationary, so that information is stored on the disk in a circular track. In order to provide effective use of the disk surface, the heads 32 are mounted on the movable carriage 28.

The carriage 28 is translated-along the radial path R—R by means of the stepper motor 30 and drive mechanism 52. The carriage 28 may be slidably mounted on a track (not shown) which defines a path of movement for the carriage parallel to the radial axis R—R. The stepper motor 30 advances and retracts the carriage 28 in descrete steps, so that information may be recorded on or read from the disk in well defined, concentric tracks.

The transducer heads 32 may be electrically connected to the input or preamplifier circuit board 34 by means of a ribbon cable and connector assembly 54. The ribbon cable and connector assembly may consist of a first portion 56 fixed to the carriage 28, a second portion 58 fixed to the disk drive chassis, a connector 60 for electrically connecting the cable to the circuit board 34 and a third ribbon cable portion 62 contiguous with the first and second portions. The third portion of the ribbon cable may be held in an "S" shaped configuration so that the cable extends away from the first portion of the cable in region 64 and thus away from the radial path R—R. Then, the cable curves back inwardly in region 66 toward the radial path R—R. Then, the third portion of the cable passes the radial path at 68 and extends away from the radial path. Finally, the cable curves back toward the radial R—R at 70 until it reaches the second cable portion which is fixed to the disk drive chassis frame 20. The "S" figure expands and contracts along an axis parallel to the radial path R—R as the carriage moves radially with respect to the chassis. The third portion of the cable, configured in a S-shaped figure is constrained so that the "S" shaped figure lies between the location of the magnetic disk and heads, the circuit board 34 and the drive motor 30 and drive mechanism 52.

FIGS. 3a and 3b are details of the magnetic disk system of FIGS. 1 and 2 wherein similar structures are identified by like numerals. FIGS. 3a and 3b show the flexing of the cable connector assembly as the carriage is moved along the radial axis R—R. In FIG. 3a the heads 32 are relatively close to a radial edge of the disk 12. In FIG. 3b the heads and carriage 28 have been translated toward the center of the disk 12. As indicated in the figure the total distance of movement of the heads from the radially outermost radially innermost location may be on the order of ½ inch. In response to this movement the "S" shape configured by the cable assembly 54 has been expanded or elongated in a direction generally parallel to the radial axis R—R of movement of the carriage 28.

The cable and connector assembly 54 is shown in an unbent configuration in FIG. 4. The first, second and third portions of the cable are indicated by the brackets 56, 58 and 62, respectively. The connector 60 is shown in partial phantom in a side elevational detail 80. As shown in FIG. 4 the connector may take the form of a socket having apertures 82 containing conductors which are interfitted with conductors lying on a circuit board to which the cable and connector assembly is attached.

Advantageously, the cable may be made of a polymer film ribbon with multiple parallel metal strips embedded therein. Exposed contacts 84 in ribbon portion 56 may be connected to the transducer heads. An "L" shaped portion 86 of the cable may be looped over the chassis frame 20 at location 88 as shown in FIGS. 3a and 3b.

In this specification reference is made to the principal plane of the ribbon cable. In FIG. 4 that plane is the plane of the figure. The plane is distorted when the cable and connector assembly is installed in the disk drive system and held in the "S" shaped configuration. However, that distorted plane of the portion 62 of the ribbon remains approximately parallel to the axis of rotation of the magnetic storage disk.

The configuration and orientation of the ribbon cable and connector assembly 28 may be compared with the prior art structure shown in FIG. 5a and 5b. In these structures a carriage assembly 28' is shown having a direction of radial movement with respect to a disk 12'. In both of these examples the ribbon cables 54' have a "U" shaped configuration.

Referring once more to FIG. 2, the drive mechanism 52 of the system will now be described in greater detail. The carriage 28 is formed with a first arm 100 and a second arm 102. Advantageously, the arms 100 and 102 may be parallel to one another and perpendicular to the path of radial motion R—R of the carriage along its track. The drive mechanism 52 for moving the carriage along the track may include the stepper motor 30 which is stationary with respect to the track and has a rotatable shaft 104 generally parallel to the first and second arms 100 and 102. A first flexible band 106 may be attached to the first arm 100 and to the shaft 104 so that the band is wound and unwound about the shaft as the shaft rotates and the carriage moves responsively thereto. A second flexible band 108 may be attached to the first arm 100 at a point displaced from the first band and attached to the shaft 104 at a point displaced from the first band, the second band being wound and unwound about the shaft in a like manner to the first. A third flexible band 110 may be attached to the second arm 102 and to the shaft 104 at a point between the points of attachment of the first and second bands, the third band being wound and unwound about the shaft in an opposite direction of the first two bands as the shaft rotates.

In a preferred embodiment of the present invention the first, second and third bands are attached to their respective arms with pins 112 so that the bands are free to pivot slightly with respect to the arms, the shaft and one another.

FIG. 6a is a side elevation of the band actuator embodiment of FIG. 2, wherein similar structures are identified by like numerals. As shown in the figure, the second band 108 and the third band 110 wind about the shaft in opposite directions as the shaft is rotated. Advantageously, the first and second bands may be formed with a spring portion 116 which holds the bands under tension.

FIG. 6b is a plan view of a band structure employed in a preferred embodiment of the present invention. In this embodiment, the bands 106 and 108 and 110 are formed integrally and connected at a center portion 118 which is connected to the shaft 104 by means of a suitable fastener inserted through the aperature 120. A reinforcement leaf 122 may overlie the band structure. Likewise, reinforcement leaves 124 may be provided about apertures 126, 127, 128 for receiving the pins 112. Apertures 126, 127, 128 are slightly larger in diameter than pins 112 so that the bands can orient and align themselves in use. As will be seen from the figure this integral structure forms a "Y" shaped configuration (the "Y" of FIG. 6 being oriented on its side).

FIG. 6c is a plan view of another embodiment of the band actuator of this invention. In this embodiment, a single unit double spring unit 116 connects bands 104 and 106 to arm 100. Again, it is the paired bands that incorporate the springs and the attachment of the bands to arms 100 and 102 is accomplished via pins 112 and apertures. Although not shown, in all these embodiments it is possible to employ cover plates over the pins to prevent the bands from "jumping" off. These plates do not clamp the bands rigidly to the arms so they are free to pivot about the pins.

FIG. 7 is a plan view of a prior art band actuator. In this device the two outer bands are formed into a U 130 that is rigidly affixed to arm 131 via screws 132 and 134. The center band 135 is attached to spring unit 136 which is in turn rigidly affixed to arm 137 by screw 138. This works well when all parts are perfectly aligned. However, in a real device setting with real manufacturing tolerances two problems arise. First, the two outer bands become differently tensioned and wear rapidly. Their rigid attachment prevents them from correcting for this. The bands are rigidly attached and are thus not gree to pivot with respect to one another to account for alignment or dimensional errors in the components of the system. The central band, because it carries the tensioning spring 136, does not provide a precise distance between the motor shaft and arm 137 and thus it becomes difficult to position the carriage with needed precision with age and wear of the drive.

In contrast to the prior art devices as represented in FIG. 7, the present invention provides a U-shaped spring member 116 on each of the paired bands extending from the assembly, as shown in FIGS. 6a-6c. Each portion 116 extends in U-shaped fashion from the nominal plane of the band assembly, as shown in FIG. 6a, and is disposed adjacent to the respective end portion of one of the bands 106 or 108. This feature permits independent accommodation to the variable tensions on the bands, and adds significantly to the useful life of the band actuator. It should be noted that the various features depicted in FIGS. 6a-6c may be combined variously, according to the skill and design of the individual skilled in the art. For example, such features include the formation of the distal ends of the bands 106 and 108 as either a single unit or separate units (FIG. 6c versus FIG. 6b), combined with the choice of forming the bands 106 and 108 either integrally or separately with the spring units 116 (FIG. 6c versus FIGS. 6a and 6c). In any case, the significant factor is that the spring units 116 are disposed to flexibly yield independently under unequal tensions caused by shaft misalignment and the like.

FIGS. 8a and 8b are a side elevation and plan view in cross section of a carriage and track assembly constructed according to the teachings of the present invention. The stationary carriage track may comprise a pair of parallel rods 150. The carriage 28 is disposed to slidably engage the parallel rods 150 by means of the linear bearings 152.

A portion of the carriage assembly may include an extruded metal base member 154 having a plate portion 156 and two parallel rib portions 158. A first linear bearing 160 may be disposed against one of the parallel ribs and adapted for slidably engaging one of the parallel rods. Two more linear bearings 162 may be disposed against the other of the parallel ribs and adapted for slidably engaging the other of the parallel rods. In a preferred embodiment of the present invention the rib portions 158 are perpendicular to the plate portion. The linear bearings are cylindrical and contain ball bearings 164. The cylindrical linear bearings may be pressed against a rib and the plate portion so that the longitudinal axis of the bearings are parallel to the lines of intersection of the rib and plate portions and parallel to the direction of movement of the carriage along the track. Advantageously, the linear bearings 152 may be pressure loaded in position by brackets 166 and upper plate 168. The direction of the force of this pressure loading is indicated schematically by the arrows 170.

FIG. 9 is the side elevation of a prior art carriage and track assembly. The carriage is intended to ride on parallel rods 150' by means of linear bearings 152'. The linear bearings 152' are pressure fitted into apertures in a solid plate 190 employed as the base of the carriage assembly. Correct alignment of the linear bearings requires extremely high tolerance machining of the base piece 190.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

We claim:

1. In an apparatus for moving a magnetic transducer relative to a rotating disk in a magnetic disk drive system which includes a carriage track, a carriage movable along the track for moving the magnetic transducer relative to the track, a drive mechanism for moving the carriage along the track, including a stepper motor stationary with respect to the track and having a rotatable shaft, the improvement comprising:

flexible band actuator means securable to first and second portions of said carriage which are spaced longitudinally along said track, said band actuator means including first, second, and third band portions extending integrally from a common medial band portion in a general Y configuration, means for securing said common medial portion to the shaft of the stepper motor, with said first, second, and third band portions disposed to be wound and unwound about the shaft as the shaft rotates, said first and second band portions each including spring means for tensioning the respective band portions and for expanding to tolerate misalignment of the shaft, said spring means including a generally U-shaped portion formed in each of said first and second bands, means for joining the distal ends of said first and second band portions to the first portion of the carriage, and means for joining the distal end of said third band portion to the second portion of the carriage.

* * * * *